United States Patent
Miyagishima et al.

(10) Patent No.: US 10,739,556 B2
(45) Date of Patent: Aug. 11, 2020

(54) IMAGING LENS AND IMAGING APPARATUS

(71) Applicant: FUJIFILM Corporation, Tokyo (JP)

(72) Inventors: Shunsuke Miyagishima, Saitama (JP); Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 16/133,479

(22) Filed: Sep. 17, 2018

(65) Prior Publication Data

US 2019/0094496 A1 Mar. 28, 2019

(30) Foreign Application Priority Data

Sep. 25, 2017 (JP) .................. 2017-183300

(51) Int. Cl.
| | | |
|---|---|---|
| *G02B 9/34* | (2006.01) | |
| *G02B 13/00* | (2006.01) | |
| *G02B 27/64* | (2006.01) | |
| *G02B 13/02* | (2006.01) | |
| *G02B 15/14* | (2006.01) | |

(52) U.S. Cl.
CPC ............. *G02B 9/34* (2013.01); *G02B 13/004* (2013.01); *G02B 13/006* (2013.01); *G02B 13/02* (2013.01); *G02B 27/646* (2013.01); *G02B 13/0045* (2013.01); *G02B 15/144* (2019.08); *G02B 15/144103* (2019.08); *G02B 15/144111* (2019.08)

(58) Field of Classification Search
CPC .. G02B 27/646; G02B 13/02; G02B 13/0045; G02B 9/64; G02B 13/006; G02B 15/144; G02B 15/144111; G02B 15/144103
See application file for complete search history.

(56) References Cited

U.S. PATENT DOCUMENTS

| | | | | |
|---|---|---|---|---|
| 2013/0308041 A1* | 11/2013 | Hatada | ................ | G02B 27/646 348/360 |
| 2014/0063604 A1* | 3/2014 | Wada | .................... | G02B 15/14 359/557 |
| 2015/0109519 A1* | 4/2015 | Fujikura | ............... | G02B 13/02 348/360 |
| 2015/0130985 A1* | 5/2015 | Kawamura | .......... | G02B 13/02 348/345 |
| 2015/0138428 A1* | 5/2015 | Fujikura | ............. | G02B 15/167 348/345 |
| 2017/0199356 A1 | 7/2017 | Iwamoto | | |

FOREIGN PATENT DOCUMENTS

| | | |
|---|---|---|
| JP | 2016-161644 A | 9/2016 |
| JP | 2017-122871 A | 7/2017 |

* cited by examiner

*Primary Examiner* — Christopher Stanford
(74) *Attorney, Agent, or Firm* — Studebaker & Brackett PC

(57) ABSTRACT

The imaging lens consists of, in order from an object side, a first lens group having a positive refractive power, a second lens group having a positive refractive power, a stop, a third lens group having a negative refractive power, and a fourth lens group. The first lens group has, in order from the object side, a positive single lens, and two or more cemented lenses. The second lens group consists of a positive lens and a negative lens. During image blur correction, only the third lens group moves. A conditional expression relating to the back focal length Bf and the lens system total length TTL is satisfied: $2 < TTL/Bf < 3.6$.

16 Claims, 15 Drawing Sheets

EXAMPLE 1

EXAMPLE 1

EXAMPLE 2

EXAMPLE 3

EXAMPLE 4

EXAMPLE 5

EXAMPLE 6

EXAMPLE 1

EXAMPLE 4

IMAGING LENS AND IMAGING APPARATUS

CROSS-REFERENCE TO RELATED APPLICATIONS

The present application claims priority under 35 U.S.C. § 119 to Japanese Patent Application No. 2017-183300, filed on Sep. 25, 2017. The above application is hereby expressly incorporated by reference, in its entirety, into the present application.

BACKGROUND OF THE INVENTION

1. Field of the Invention

The present invention relates to an imaging lens and an imaging apparatus, and in particular, to an imaging lens suitable for a digital camera, a video camera, and the like, and an imaging apparatus comprising the imaging lens.

2. Description of the Related Art

In the related art, as an imaging lens for use in an imaging apparatus such as a digital camera, JP2017-122871A and JP2016-161644A have been proposed. JP2017-122871A and JP2016-161644A describe a lens system that performs image blur correction by moving a part of an imaging lens in a direction in which the imaging lens can be set to have a component in a direction perpendicular to the optical axis.

SUMMARY OF THE INVENTION

In recent years, in accordance with the spread of so-called non-reflex cameras, there is a demand for an imaging lens that is small in size while maintaining high optical performance Particularly, in telephoto type imaging lenses in which the original total length of the lens system is long as compared with the wide-angle type and the standard type, the demand for reduction in size is getting stronger. However, in the lens systems described in JP2017-122871A and JP2016-161644A, the total length of the lens system is long as the focal length is increased, and the lens systems did not sufficiently cope with the recent demand for reduction in size.

The present invention has been made in consideration of the above-mentioned situations, and it is an object of the present invention to provide an imaging lens having high optical performance, in which various aberrations are satisfactorily corrected while achieving reduction in size, and an imaging apparatus comprising the imaging lens.

In order to cope with the above-mentioned demands, an imaging lens of the present invention consists of, in order from an object side to an image side: a first lens group that has a positive refractive power; a second lens group that has a positive refractive power; a stop; a third lens group that has a negative refractive power; and a fourth lens group that has a refractive power. The first lens group has, in order from the object side to the image side, a single lens having a positive refractive power, and two or more cemented lenses, and each cemented lens includes a positive lens and a negative lens. The second lens group consists of a negative lens and a positive lens. During image blur correction, the entire third lens group moves in a direction in which the third lens group can be set to have a component perpendicular to an optical axis, and the first lens group, the second lens group, and the fourth lens group remain stationary with respect to an image plane. In addition, it is preferable that in a state where an object at infinity is in focus, assuming that a back focal length of the whole system at an air-converted distance is Bf and a sum of the Bf and a distance on the optical axis from a lens surface closest to the object side to a lens surface closest to the image side is TTL, Conditional Expression (1) is satisfied.

$$2<TTL/Bf<3.6 \tag{1}$$

It is preferable that the imaging lens of the present invention satisfies Conditional Expression (1-1).

$$2.5<TTL/Bf<3.5 \tag{1-1}$$

In the imaging lens of the present invention, it is preferable that during focusing from the object at infinity to a close-range object, the second lens group moves toward the object side along the optical axis, and the first lens group, the third lens group, and the fourth lens group remain stationary with respect to the image plane.

In the imaging lens of the present invention, assuming that a focal length of the whole system in a state where the object at infinity is in focus is f and a focal length of the second lens group is f2, it is preferable to satisfy Conditional Expression (2), and it is more preferable to satisfy Conditional Expression (2-1).

$$1.8<f/f2<2.5 \tag{2}$$

$$2<f/f2<2.4 \tag{2-1}$$

In the imaging lens of the present invention, assuming that a partial dispersion ratio between a g line and an F line of the positive lens of the second lens group is θgF22 and a partial dispersion ratio between the g line and the F line of the negative lens of the second lens group is θgF21, it is preferable to satisfy Conditional Expression (3), and it is more preferable to satisfy Conditional Expression (3-1).

$$0.03<|\theta gF22-\theta gF21|<0.045 \tag{3}$$

$$0.032<|\theta gF22-\theta gF21|<0.042 \tag{3-1}$$

In the imaging lens of the present invention, assuming that a focal length of the first lens group is f1 and a focal length of the second lens group is f2, it is preferable to satisfy Conditional Expression (4), and it is more preferable to satisfy Conditional Expression (4-1).

$$1<f1/f2<3 \tag{4}$$

$$1.5<f1/f2<2.8 \tag{4-1}$$

In the imaging lens of the present invention, it is preferable that the second lens group consists of, in order from the object side to the image side, a negative meniscus lens concave toward the image side and a positive meniscus lens concave toward the image side.

In the imaging lens of the present invention, it is preferable that the third lens group has two or more lenses. More specifically, it is preferable that the third lens group has a negative lens concave toward the image side and a biconcave lens.

In the imaging lens of the present invention, it is preferable that the fourth lens group has three or more lenses including a cemented lens.

In the imaging lens of the present invention, it is preferable that a second cemented lens is disposed to be adjacent to a first cemented lens on the image side of the first cemented lens which is disposed to be closest to the object side in the first lens group, and the first cemented lens has a cemented surface convex toward the image side, and the second cemented lens has a cemented surface convex toward the object side.

In the imaging lens of the present invention, it is preferable that all the cemented lenses of the first lens group each have a convex surface closest to the object side and a concave surface closest to the image side.

An imaging apparatus of the present invention comprises the imaging lens of the present invention.

In the present description, it should be noted that the term "consists of ~" is used in a substantial sense, and means that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, it should be noted that the "~ group having a positive refractive power" means that the group has a positive refractive power as a whole. Likewise, the "~ group having a negative refractive power" means that the group has a negative refractive power as a whole. The sign of the refractive power is considered in terms of the paraxial region in a case where an aspheric surface is included. The "lens group" is not necessarily composed of a plurality of lenses, but may be composed of only one lens. The "single lens" means one uncemented lens. The "whole system" means the entire imaging lens. The "back focal length" is the distance on the optical axis from the lens surface closest to the image side to the image side focal point. All Conditional Expressions are based on the d line (a wavelength of 587.6 nm (nanometers)) in a state where an object at infinity is in focus.

It should be noted that the partial dispersion ratio $\theta gF$ between the g line and the F line of a certain lens is defined by $\theta gF=(Ng-NF)/(NF-NC)$, where the refractive indexes of the lens at the g line (a wavelength of 435.8 nm (nanometers)), F line (a wavelength of 486.1 nm (nanometers)), and C line (a wavelength of 656.3 nm (nanometers)) are Ng, NF, and NC, respectively.

According to the present invention, in order from the object side, a lens system consists of a first lens group having a positive refractive power, a second lens group having a positive refractive power, a stop, a third lens group having a negative refractive power, and a fourth lens group in order from the object side. In the lens system, the third lens group is used for image blur correction, the configuration of each lens group is suitably set, and the lens system satisfies the predetermined conditional expressions. Thereby, it is possible to provide an imaging lens having high optical performance, in which various aberrations are satisfactorily corrected while achieving reduction in size, and an imaging apparatus comprising the imaging lens.

DESCRIPTION OF THE PREFERRED EMBODIMENTS

Figure 1:
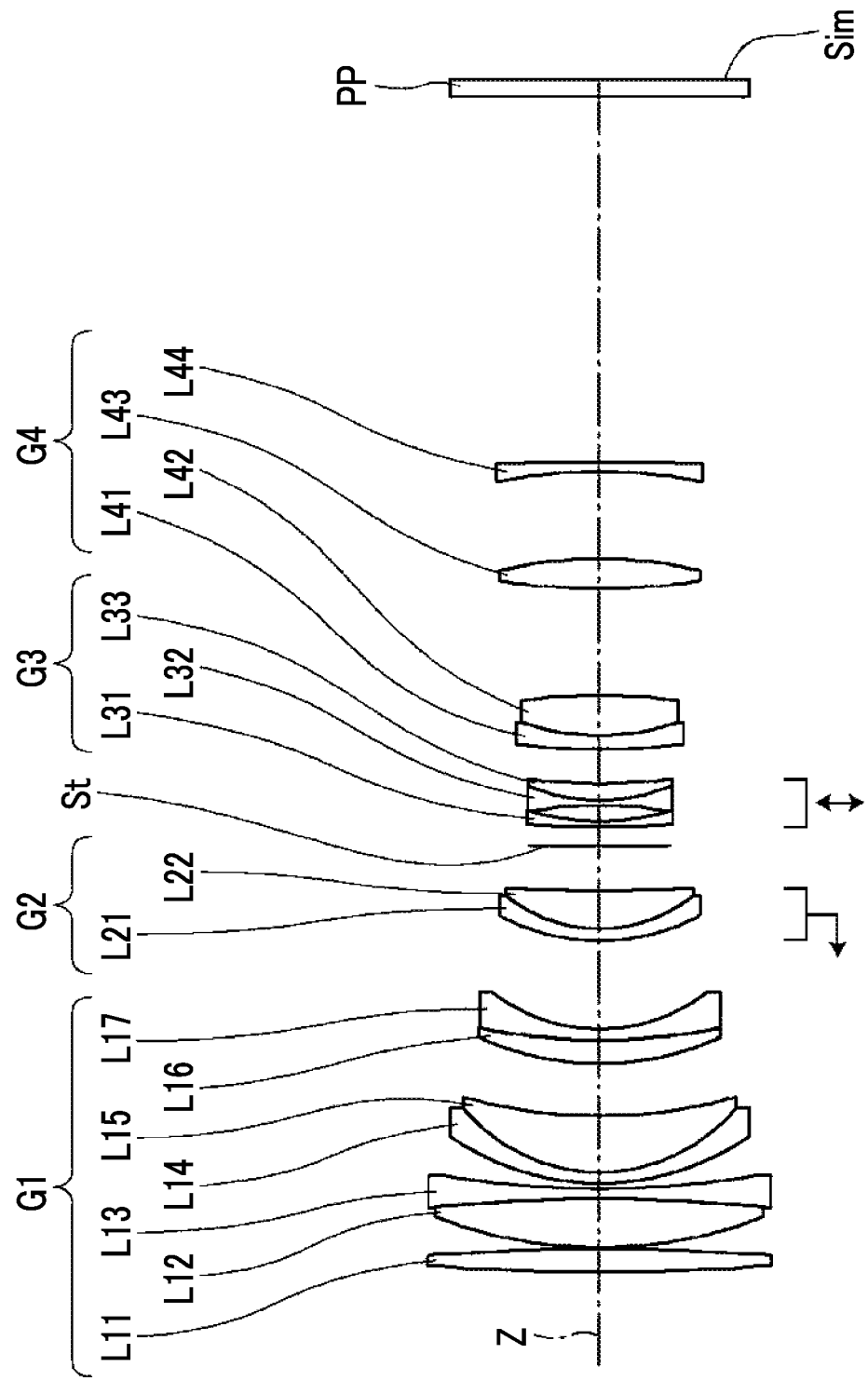
FIG. 1 is a cross-sectional view illustrating a configuration of an imaging lens (imaging lens of Example 1 of the present invention) according to an embodiment of the present invention.
Figure 7:
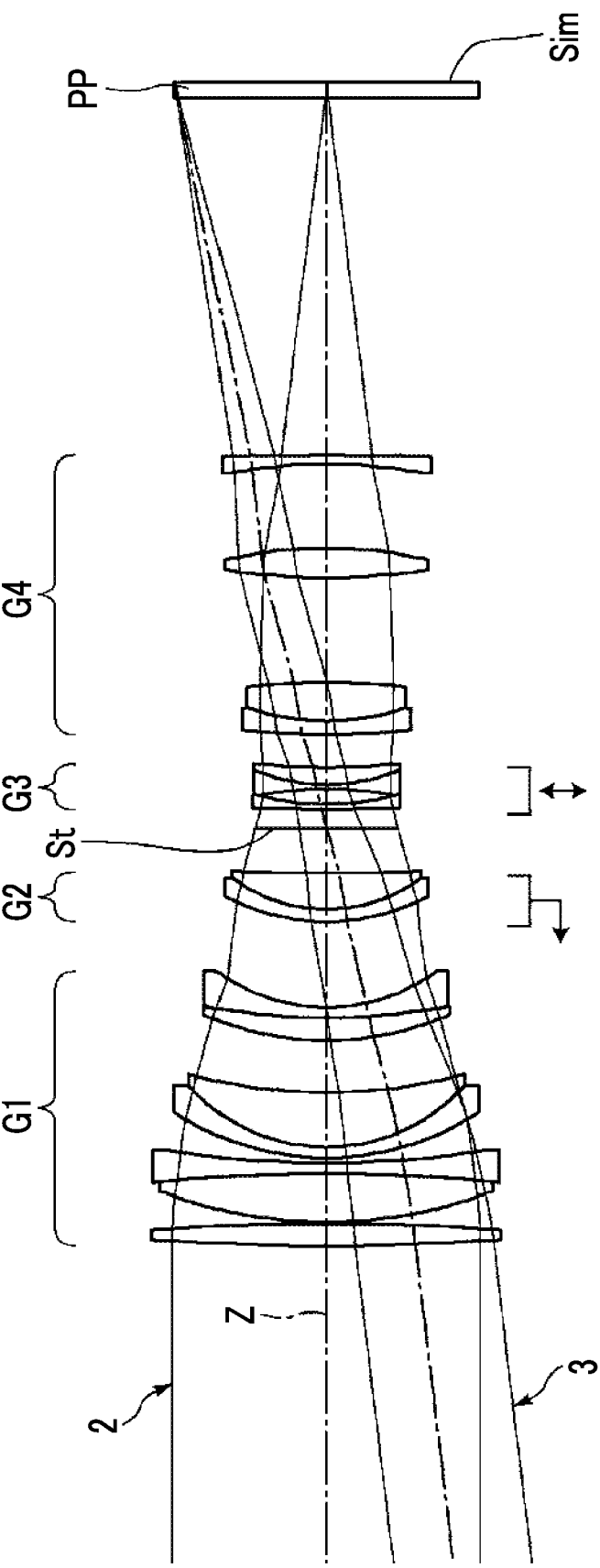
FIG. 7 is a cross-sectional view illustrating optical paths of the imaging lens shown in FIG. 1.

Hereinafter, embodiments of the present invention will be described with reference to drawings. FIG. 1 is a cross-sectional view illustrating a configuration of an imaging lens according to an embodiment of the present invention. The example shown in FIG. 1 corresponds to the imaging lens of Example 1 to be described later. Further, FIG. 7 is shows a lens configuration of the imaging lens of FIG. 1, and on-axis rays 2 and rays with the maximum angle of view 3. FIGS. 1 and 7 each show a situation where the object at infinity is in focus, the left side thereof is an object side, and the right side thereof is an image side.

The imaging lens consists of, in order from the object side to the image side along the optical axis Z, a first lens group G1 having a positive refractive power, a second lens group G2 having a positive refractive power, an aperture stop St, a third lens group G3 having a negative refractive power, and a fourth lens group G4 having a refractive power. It should be noted that the aperture stop St shown in FIG. 1 does not necessarily indicate its size and shape, and indicates a position of the stop on the optical axis Z.

In the example of FIG. 1, the first lens group G1 consists of seven lenses L11 to L17 sequentially in order from the object side to the image side. The second lens group G2 consists of two lenses L21 and L22 in order from the object side to the image side. The third lens group G3 consists of three lenses L31 to L33 in order from the object side to the image side. The fourth lens group G4 consists of four lenses L41 to L44 in order from the object side to the image side.

In addition, FIG. 1 shows an example in which an optical member PP having a plane parallel plate shape is disposed between the lens closest to the image side and the image plane Sim. However, the optical member PP may be disposed at a position different from that in the example of FIG. 1, or the optical member PP may be omitted. The optical member PP is assumed to be various filters such as an infrared cut filter and a low pass filter, a cover glass, and/or the like.

This imaging lens has an image blur correction function. During image blur correction, the entire third lens group G3 moves in a direction in which the third lens group G3 can be set to have a component perpendicular to the optical axis Z, and the first lens group G1, the second lens group G2, and the fourth lens group G4 remain stationary with respect to the image plane Sim. That is, the third lens group G3 functions as a vibration reduction lens group, and vibration reduction is performed by moving the entire third lens group G3 in a direction in which the third lens group G3 can be set to have a component perpendicular to the optical axis Z. It is possible to reduce the diameter and the weight of the vibration reduction lens group by performing the vibration reduction on the group immediately after the image side of the aperture stop St.

The first lens group G1 has, in order from the object side to the image side, a single lens having a positive refractive power and two or more cemented lenses. All the cemented lenses of the first lens group G1 each include one positive lens and one negative lens. Therefore, the first lens group G1 has three or more positive lenses and two or more negative lenses. With such a configuration, it is possible to satisfactorily correct spherical aberration and longitudinal chromatic aberration while reducing the size of the imaging lens.

It is preferable that a second cemented lens is disposed to be adjacent to a first cemented lens on the image side of the first cemented lens which is disposed to be closest to the object side in the first lens group G1, and the first cemented lens has a cemented surface convex toward the image side, and the second cemented lens has a cemented surface convex toward the object side. In such a manner, by arranging the cemented surfaces having opposite refractive powers side by side, it is possible to effectively correct distortion and astigmatism. In the example of FIG. 1, the cemented lens consisting of the lens L12 and the lens L13 corresponds to the first cemented lens, and the cemented lens consisting of the lens L14 and the lens L15 corresponds to the second cemented lens.

It is preferable that all the cemented lenses of the first lens group G1 each have a convex surface closest to the object side and a concave surface closest to the image side. In such a case, all of the cemented lenses of the first lens group G1 are lens components each having a meniscus shape. By adopting such a shape, it is possible to shorten the total length of the lens system and to reduce the diameter of the lens while suppressing occurrence of spherical aberration.

For example, the first lens group G1 may be configured to consist of, in order from the object side to the image side, a single lens having a positive refractive power and three cemented lenses. More specifically, for example, the first lens group G1 may be configured to consist of, in order from the object side to the image side, a single lens having a biconvex shape, a cemented lens in which a biconvex lens and a biconcave lens are cemented in order from the object side, a cemented lens in which a negative meniscus lens convex toward the object side and a positive meniscus lens convex toward the object side are cemented in order from the object side, and a cemented lens in which a positive meniscus lens convex toward the object side and a negative meniscus lens convex toward the object side are cemented in order from the object side.

The second lens group G2 consists of a negative lens and a positive lens. Since the second lens group G2 has the negative lens and the positive lens, chromatic aberration of the group alone can be suitably suppressed, and fluctuation in chromatic aberration caused by focusing can be suitably suppressed. Since the second lens group G2 consists of two negative and positive lenses, it is possible to reduce the size and weight of the second lens group G2 while suppressing fluctuation in chromatic aberration caused by focusing. This is advantageous in reducing the load on the driving system and increasing the focusing speed. The negative lens and the positive lens of the second lens group G2 may be cemented to each other or does not have to be cemented.

It is preferable that the second lens group G2 consists of, in order from the object side to the image side, a negative meniscus lens concave toward the image side and a positive meniscus lens concave toward the image side. In such a case, spherical aberration can be suppressed, and a difference in spherical aberration due to wavelength can be suppressed.

The second lens group G2 may have a function as a focusing lens group that moves along the optical axis Z during focusing. For example, during focusing from an object at infinity to a close-range object, the second lens group G2 may move to the object side along the optical axis Z, and the first lens group G1, the third lens group G3, and the fourth lens group G4 may remain stationary with respect to the image plane Sim. By moving only the second lens group G2 during focusing, it is possible to reduce the size and weight of the focusing unit that moves during focusing, and there is an advantage in increasing the focusing speed.

The aperture stop St is disposed between the second lens group G2 and the third lens group G3. By disposing the aperture stop St immediately before the object side of the vibration reduction lens group, it is possible to minimize the height of the ray incident on the vibration reduction lens group, and it is possible to reduce the diameter of the lens of the vibration reduction lens group.

It is preferable that the third lens group G3 has two or more lenses. In such a case, by adopting a configuration using a plurality of lenses, it becomes easy to suppress fluctuation in aberrations during image blur correction. In a case where the third lens group G3 has two or more lenses including the positive lens and the negative lens, occurrence of chromatic aberration in the third lens group G3 alone can be suppressed.

It is preferable that the third lens group G3 has a negative lens concave toward the image side and a biconcave lens. The third lens group G3 is configured to include a total of three concave surfaces including the image side surface of the negative lens concave toward the image side and the object side surface and the image side surface of the biconcave lens. With such a configuration, it is possible to suppress fluctuation in aberrations during image blur correction.

The third lens group G3 may be configured to consist of two or three lenses. In such a case, there is an advantage in making the vibration reduction lens group small while suppressing fluctuation in aberrations during image blur correction. For example, the third lens group G3 may be configured to consist of, in order from the object side to the image side, a negative lens concave toward the image side and a cemented lens in which a biconcave lens and a positive meniscus lens concave toward the image side are cemented in order from the object side. Alternatively, the third lens group G3 may be configured to consist of, in order from the object side to the image side, a negative lens concave toward the image side and a biconcave lens.

It is preferable that the fourth lens group G4 has three or more lenses including a cemented lens. The fourth lens group G4 consists of three or more lenses and includes a cemented lens. Thereby, occurrence of chromatic aberration in the fourth lens group G4 alone can be suppressed.

The fourth lens group G4 may be configured to consist of three or four lenses. For example, the fourth lens group G4 may be configured to consist of, in order from the object side to the image side, a cemented lens in which a negative meniscus lens and a biconvex lens are cemented in order from the object side, a biconvex lens, and a negative meniscus lens concave toward the object side. Alternatively, the fourth lens group G4 may be configured to consist of, in order from the object side to the image side, a cemented lens, in which a negative meniscus lens and a biconvex lens are cemented in order from the object side, and a biconvex lens.

As described above, the fourth lens group G4 remains stationary with respect to the image plane Sim during image blur correction. In addition to this, it is preferable that the fourth lens group G4 remains stationary with respect to the image plane Sim even during focusing. In such a case, a lens group, which remains stationary with respect to the image plane Sim, can be provided to be closest to the image side. Therefore, excellent dustproofness can be ensured.

In a state where an object at infinity is in focus, assuming that a back focal length of the whole system at an air-converted distance is Bf and a sum of the Bf and a distance on the optical axis from a lens surface closest to the object side to a lens surface closest to the image side is TTL, the imaging lens is configured to satisfy Conditional Expression (1). The TTL is a total length of the lens system. By not allowing the result of Conditional Expression (1) to be equal to or less than the lower limit, the refractive power of the fourth lens group G4 can be ensured. As a result, it becomes easy to correct astigmatism. By not allowing the result of Conditional Expression (1) to be equal to or greater than the upper limit, the total length of the lens system can be suppressed, and thus the Bf does not become excessively short. As a result, it becomes easy to make the lens system compatible with the conversion lens. In addition, in a case of a configuration in which Conditional Expression (1-1) is satisfied, it is possible to obtain more favorable characteristics.

$$2 < TTL/Bf < 3.6 \tag{1}$$

$$2.5 < TTL/Bf < 3.5 \tag{1-1}$$

In a case of using only the second lens group G2 as a focusing lens group as described above, assuming that a focal length of the whole system in a state where the object at infinity is in focus is f and a focal length of the second lens group G2 is f2, it is preferable to satisfy Conditional Expression (2). By not allowing the result of Conditional Expression (2) to be equal to or less than the lower limit, the refractive power of the focusing lens group is prevented from becoming excessively weak, and thus the amount of movement of the focusing lens group during focusing can be suppressed. As a result, there is an advantage in achieving reduction in size of the lens system. By not allowing the result of Conditional Expression (2) to be equal to or greater than the upper limit, the refractive power of the focusing lens group is prevented from becoming excessively strong, and thus it becomes easy to suppress chromatic aberration in the single focusing lens group. In addition, in a case of a configuration in which Conditional Expression (2-1) is satisfied, it is possible to obtain more favorable characteristics.

$$1.8 < f/f2 < 2.5 \tag{2}$$

$$2 < f/f2 < 2.4 \tag{2-1}$$

Further, assuming that a partial dispersion ratio between a g line and an F line of the positive lens of the second lens group G2 is θgF22 and a partial dispersion ratio between the g line and the F line of the negative lens of the second lens group G2 is θgF21, it is preferable that the imaging lens satisfies Conditional Expression (3). By not allowing the result of Conditional Expression (3) to be equal to or less than the lower limit, it becomes easy to select a combination of materials in which the difference in Abbe number between the positive lens and the negative lens composing the second lens group G2 becomes large. As a result, the chromatic aberration can be effectively corrected. By not allowing the result of Conditional Expression (3) to be equal to or greater than the upper limit, chromatic aberration in the second lens group G2 can be suppressed. As a result, change in chromatic aberration in a case of fluctuation in imaging distance caused by focusing can be reduced. In addition, in a case of a configuration in which Conditional Expression (3-1) is satisfied, it is possible to obtain more favorable characteristics.

$$0.03 < |\theta gF22 - \theta gF21| < 0.045 \tag{3}$$

$$0.032 < |\theta gF22 - \theta gF21| < 0.042 \tag{3-1}$$

Further, assuming that a focal length of the first lens group G1 is f1 and a focal length of the second lens group G2 is f2, it is preferable that the imaging lens satisfies Conditional Expression (4). By not allowing the result of Conditional Expression (4) to be equal to or less than the lower limit, the refractive power of the first lens group G1 is prevented from becoming excessively strong. As a result, it is possible to suppress occurrence of spherical aberration. By not allowing the result of Conditional Expression (4) to be equal to or greater than the upper limit, the refractive power of the second lens group G2 is prevented from becoming excessively strong. As a result, it becomes easy to suppress chromatic aberration in the second lens group G2 alone. In particular, in the case where the second lens group G2 is used as the focusing lens group, by not allowing the result of Conditional Expression (4) to be equal to or greater than the upper limit, the refractive power of the focusing lens group is prevented from becoming excessively strong. As a result, it becomes easy to suppress chromatic aberration in the focusing lens group alone. In addition, in a case of a configuration in which Conditional Expression (4-1) is satisfied, it is possible to obtain more favorable characteristics.

$$1 < f1/f2 < 3 \tag{4}$$

$$1.5 < f1/f2 < 2.8 \tag{4-1}$$

The above-mentioned preferred configurations and available configurations may be optional combinations, and it is preferable to selectively adopt the configurations in accordance with required specification. According to the present embodiment, it is possible to realize an imaging lens having high optical performance, in which various aberrations are satisfactorily corrected while achieving reduction in size.

Next, numerical examples of the imaging lens of the present invention will be described.

Example 1

FIG. 1 shows a cross-sectional view of an imaging lens of Example 1, and an illustration method thereof is as described above. Therefore, repeated description is partially omitted herein. The imaging lens of Example 1 consists of, in order from the object side to the image side, a first lens group G1 having a positive refractive power, a second lens group G2 having a positive refractive power, an aperture stop St, a third lens group G3 having a negative refractive power, and a fourth lens group G4 having a refractive power. During image blur correction, the entire third lens group G3 moves in a direction in which the third lens group can be set to have a component perpendicular to the optical axis Z, and the first lens group G1, the second lens group G2, and the fourth lens group G4 remain stationary with respect to the image plane Sim. During focusing from an object at infinity to a close-range object, the second lens group G2 moves to the object side along the optical axis Z, and the first lens group G1, the third lens group G3, and the fourth lens group G4 remain stationary with respect to the image plane Sim. The outline of the imaging lens of Example 1 has been described above. The vertical arrow below the third lens group G3 in FIG. 1 means that the third lens group G3 is a vibration reduction lens group. The leftward arrow below the second lens group G2 means that the second lens group G2 is a focusing lens group that moves to the object side during focusing from the object at infinity to the close-range object.

The first lens group G1 consists of seven lenses L11 to L17 sequentially in order from the object side to the image side. The second lens group G2 consists of two lenses L21 and L22 in order from the object side to the image side. The third lens group G3 consists of three lenses L31 to L33 in order from the object side to the image side. The fourth lens group G4 consists of four lenses L41 to L44 in order from the object side to the image side.

Table 1 shows basic lens data of the imaging lens of Example 1, and Table 2 shows specification. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line (a wavelength of 587.6 nm (nanometers)), the column of νd shows an Abbe number of each constituent element at the d line, and the column of θgF shows a partial dispersion ratio of each constituent element between the g line (a wavelength of 435.8 nm (nanometers)) and the F line (a wavelength of 486.1 nm (nanometers)).

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table.

Table 2 shows the focal length f of the whole system, the back focal length Bf of the whole system at the air-converted distance, the F number FNo., and the total angle of view 2ω. The values shown in Table 2 are values at the d line in the state where the object at infinity is in focus.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

EXAMPLE 1

| Surface Number | R | D | Nd | νd | θgF |
|---|---|---|---|---|---|
| 1 | 437.94809 | 4.340 | 1.48749 | 70.24 | 0.53007 |
| 2 | −437.94809 | 0.230 | | | |
| 3 | 88.23561 | 9.230 | 1.49700 | 81.54 | 0.53748 |
| 4 | −318.68000 | 1.950 | 1.65160 | 58.62 | 0.54102 |
| 5 | 184.29057 | 1.050 | | | |
| 6 | 52.21970 | 2.060 | 1.51742 | 52.43 | 0.55649 |
| 7 | 35.07000 | 10.600 | 1.49700 | 81.54 | 0.53748 |
| 8 | 99.36236 | 10.110 | | | |
| 9 | 58.26089 | 4.380 | 1.90366 | 31.31 | 0.59481 |
| 10 | 128.22000 | 1.950 | 1.80610 | 40.93 | 0.57019 |
| 11 | 34.81582 | 16.620 | | | |
| 12 | 41.42810 | 2.320 | 1.56732 | 42.82 | 0.57309 |
| 13 | 29.50300 | 7.110 | 1.43875 | 94.66 | 0.53402 |
| 14 | 439.02961 | 8.520 | | | |
| 15(St) | ∞ | 3.710 | | | |
| 16 | 356.62970 | 1.030 | 1.85150 | 40.78 | 0.56958 |
| 17 | 50.99860 | 2.890 | | | |
| 18 | −79.33003 | 0.900 | 1.72916 | 54.09 | 0.54490 |
| 19 | 34.97100 | 3.280 | 1.84666 | 23.78 | 0.62054 |
| 20 | 109.90490 | 6.410 | | | |
| 21 | 130.59000 | 2.630 | 1.89286 | 20.36 | 0.63944 |
| 22 | 45.98400 | 7.610 | 1.67003 | 47.20 | 0.56337 |
| 23 | −108.53459 | 20.150 | | | |
| 24 | 129.07707 | 5.690 | 1.60342 | 38.03 | 0.58356 |
| 25 | −82.47672 | 16.420 | | | |
| 26 | −104.71763 | 1.750 | 1.72916 | 54.68 | 0.54451 |
| 27 | −1000.23651 | 68.817 | | | |
| 28 | ∞ | 3.200 | 1.51680 | 64.20 | 0.53430 |
| 29 | ∞ | 0.026 | | | |

TABLE 2

Example 1

| | |
|---|---|
| f | 242.544 |
| Bf | 70.954 |
| FNo. | 4.12 |
| 2ω(°) | 13.4 |

Figure 8:
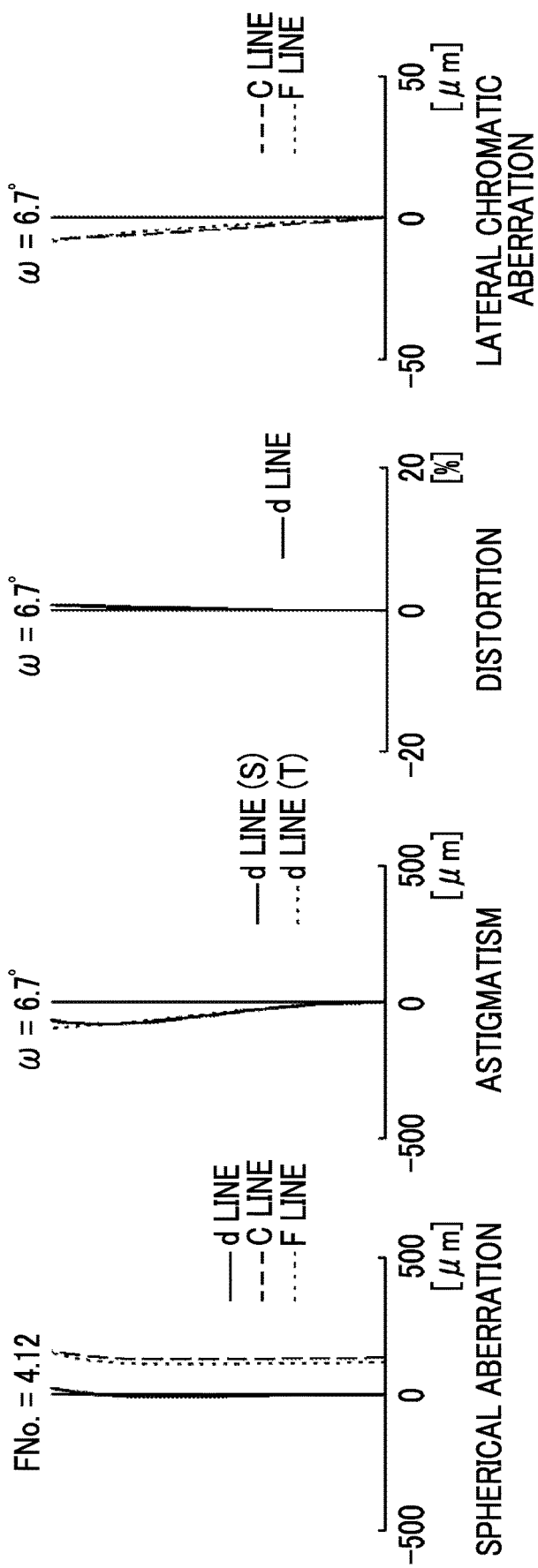
FIG. 8 is a diagram of aberrations of the imaging lens of Example 1 of the present invention.

FIG. 8 shows a diagram of aberrations of the imaging lens of Example 1. In FIG. 8, in order from the left side, spherical aberration, astigmatism, distortion, and lateral chromatic aberration are shown. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the black solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. Each of the aberration diagrams shown in FIG. 8 is in the state where the object at infinity is in focus.

The symbols, the meanings, the description method, and the illustration method of each data relating to the above-mentioned imaging lens of Example 1 are the same in Examples unless otherwise specified. Therefore, repeated examples will be omitted below.

Example 2

Figure 2:
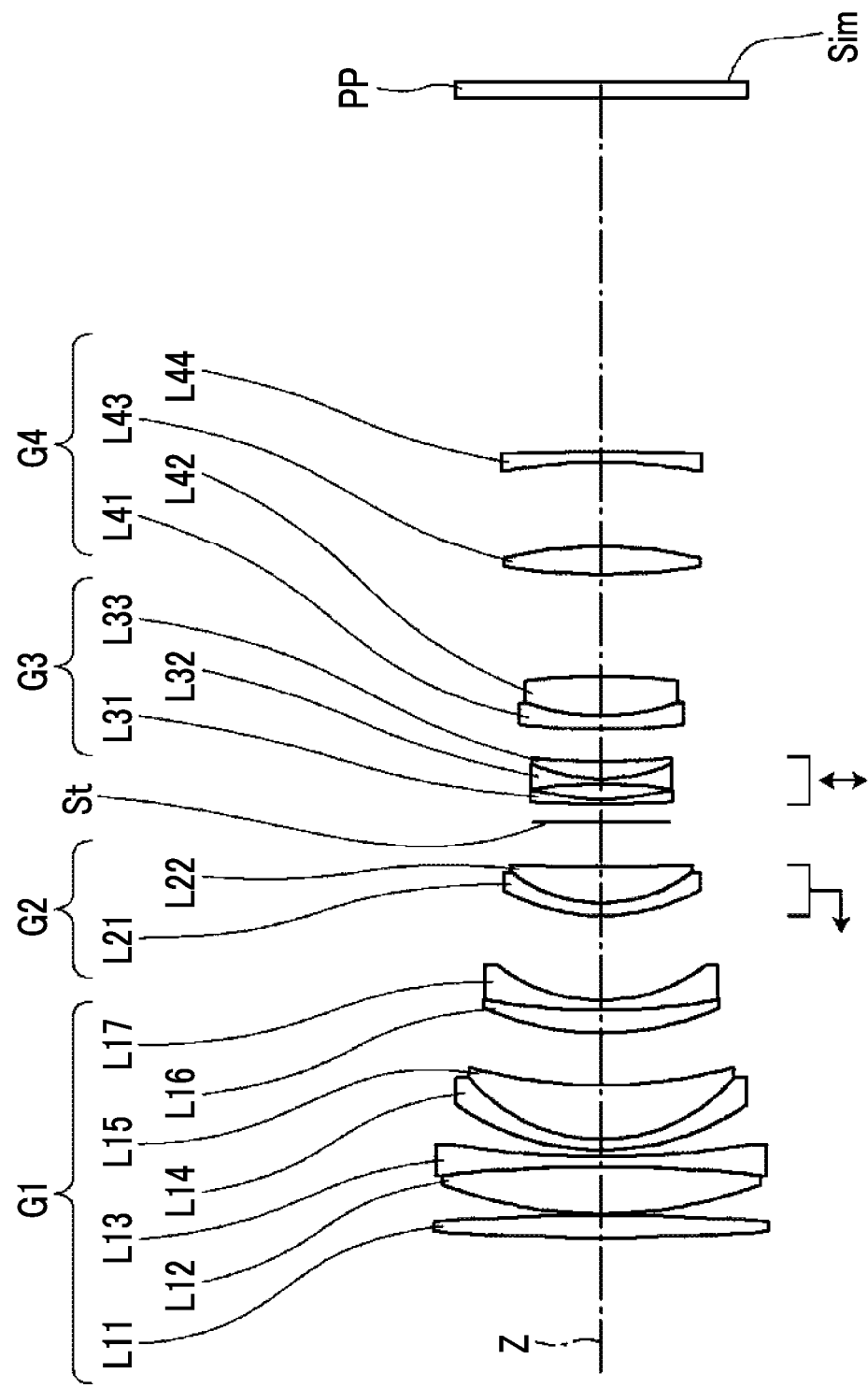
FIG. 2 is a cross-sectional view illustrating a configuration of an imaging lens of Example 2 of the present invention.
Figure 9:
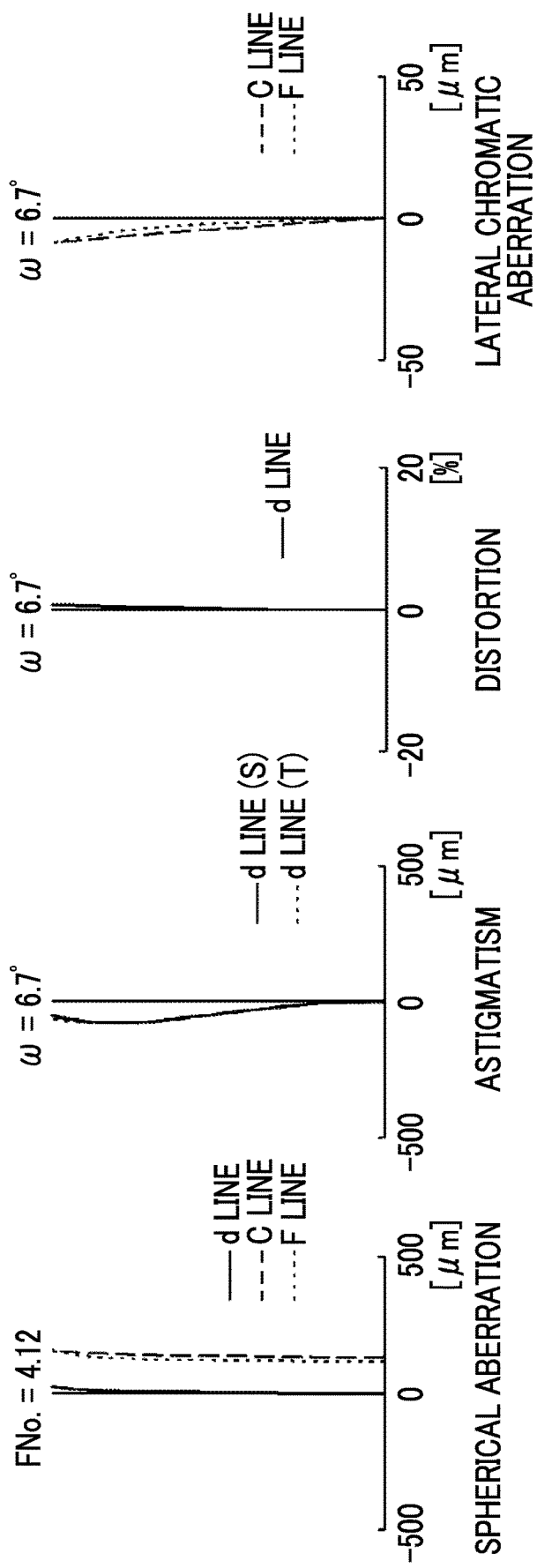
FIG. 9 is a diagram of aberrations of the imaging lens of Example 2 of the present invention.

FIG. 2 is a cross-sectional view of an imaging lens of Example 2. The imaging lens of Example 2 has the same configuration as the outline of the imaging lens of Example 1. The first lens group G1 consists of seven lenses L11 to L17 sequentially in order from the object side to the image side. The second lens group G2 consists of two lenses L21 and L22 in order from the object side to the image side. The third lens group G3 consists of three lenses L31 to L33 in order from the object side to the image side. The fourth lens group G4 consists of four lenses L41 to L44 in order from the object side to the image side. Table 3 shows basic lens data of the imaging lens of Example 2, Table 4 shows specification, and FIG. 9 shows aberration diagrams thereof.

TABLE 3

Example 2

| Surface Number | R | D | Nd | vd | θgF |
|---|---|---|---|---|---|
| 1 | 438.63112 | 4.340 | 1.48749 | 70.24 | 0.53007 |
| 2 | −438.63112 | 0.244 | | | |
| 3 | 89.95142 | 9.222 | 1.49700 | 81.54 | 0.53748 |
| 4 | −298.18291 | 1.922 | 1.65160 | 58.62 | 0.54102 |
| 5 | 189.06449 | 1.324 | | | |
| 6 | 52.16875 | 2.092 | 1.51742 | 52.43 | 0.55649 |
| 7 | 35.05016 | 10.532 | 1.49700 | 81.54 | 0.53748 |
| 8 | 100.55785 | 9.937 | | | |
| 9 | 58.28024 | 4.408 | 1.90366 | 31.31 | 0.59481 |
| 10 | 129.32334 | 1.964 | 1.80610 | 40.93 | 0.57019 |
| 11 | 34.97220 | 16.562 | | | |
| 12 | 41.53249 | 2.370 | 1.56732 | 42.82 | 0.57309 |
| 13 | 29.46470 | 0.046 | | | |
| 14 | 29.48842 | 7.089 | 1.43875 | 94.66 | 0.53402 |
| 15 | 438.63098 | 8.547 | | | |
| 16(St) | ∞ | 3.627 | | | |
| 17 | 357.14221 | 1.016 | 1.85150 | 40.78 | 0.56958 |
| 18 | 51.12345 | 3.011 | | | |
| 19 | −79.73545 | 0.952 | 1.72916 | 54.09 | 0.54490 |
| 20 | 35.01621 | 3.270 | 1.84666 | 23.78 | 0.62054 |
| 21 | 109.09694 | 6.350 | | | |
| 22 | 133.17181 | 2.622 | 1.89286 | 20.36 | 0.63944 |
| 23 | 46.22734 | 7.821 | 1.67003 | 47.20 | 0.56337 |
| 24 | −109.33289 | 19.772 | | | |
| 25 | 126.83421 | 5.393 | 1.60342 | 38.03 | 0.58356 |
| 26 | −83.30638 | 16.677 | | | |
| 27 | −105.35018 | 1.840 | 1.72916 | 54.68 | 0.54451 |
| 28 | −1000.19429 | 68.826 | | | |
| 29 | ∞ | 3.200 | 1.51680 | 64.20 | 0.53430 |
| 30 | ∞ | 0.029 | | | |

TABLE 4

Example 2

| | |
|---|---|
| f | 242.544 |
| Bf | 70.966 |
| FNo. | 4.12 |
| 2ω(°) | 13.4 |

Example 3

Figure 3:
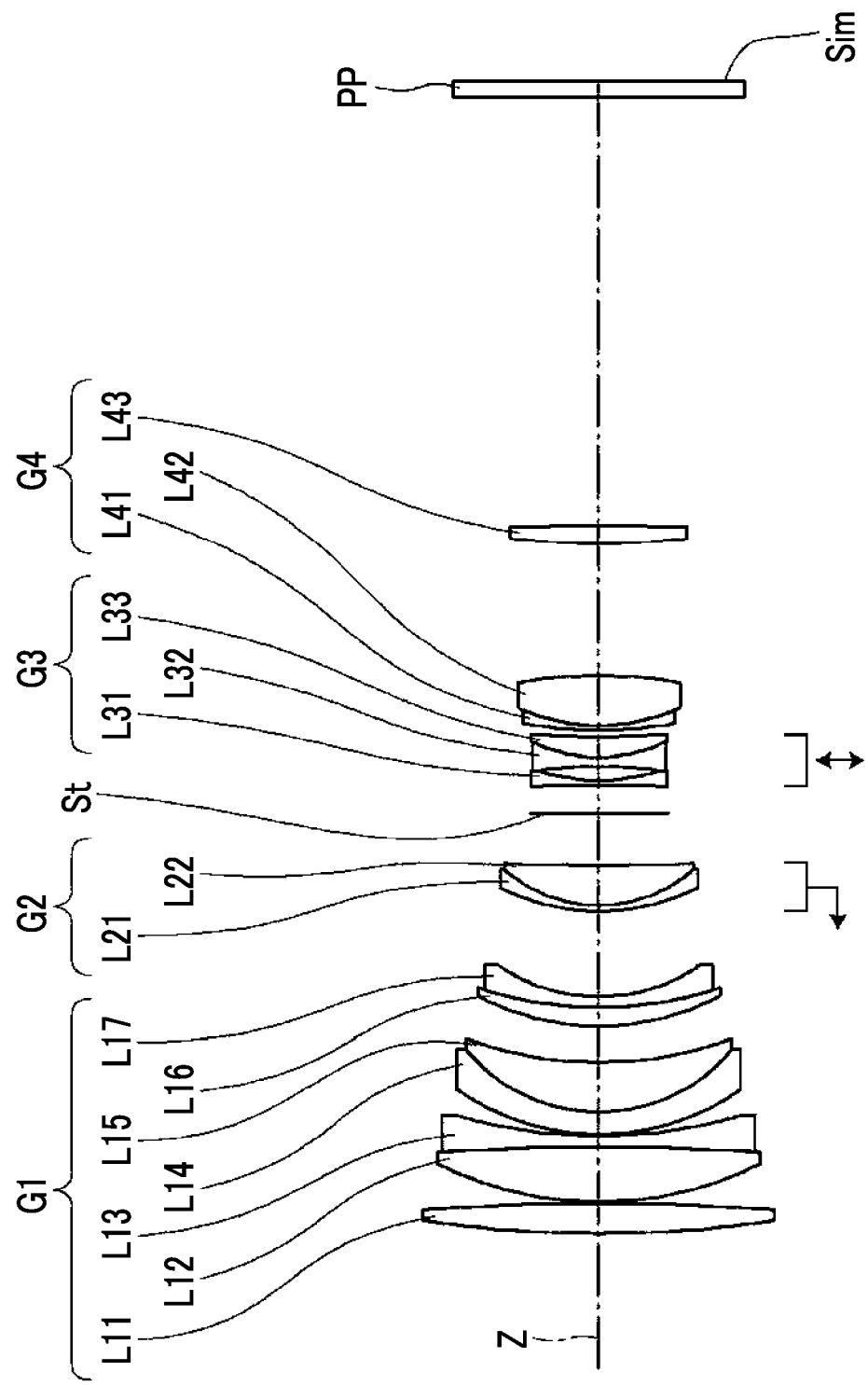
FIG. 3 is a cross-sectional view illustrating a configuration of an imaging lens of Example 3 of the present invention.
Figure 10:
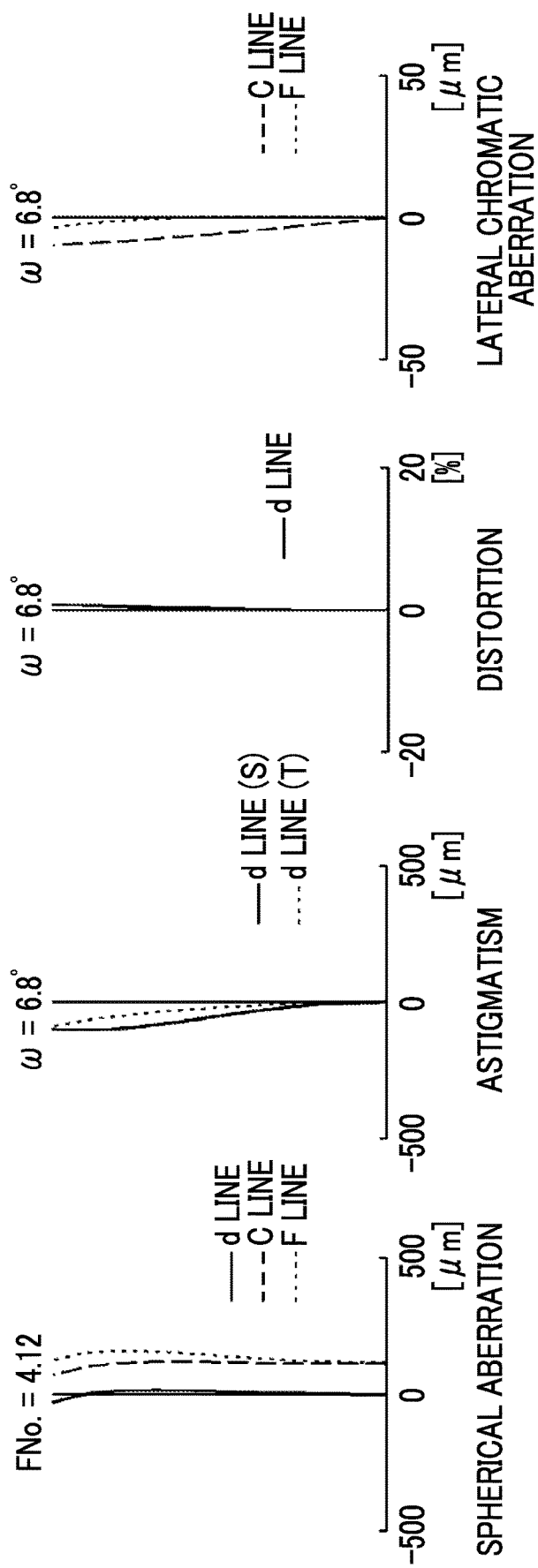
FIG. 10 is a diagram of aberrations of the imaging lens of Example 3 of the present invention.

FIG. 3 is a cross-sectional view of an imaging lens of Example 3. The imaging lens of Example 3 has the same configuration as the outline of the imaging lens of Example 1. The first lens group G1 consists of seven lenses L11 to L17 sequentially in order from the object side to the image side. The second lens group G2 consists of two lenses L21 and L22 in order from the object side to the image side. The third lens group G3 consists of three lenses L31 to L33 in order from the object side to the image side. The fourth lens group G4 consists of three lenses L41 to L43 in order from the object side to the image side. Table 5 shows basic lens data of the imaging lens of Example 3, Table 6 shows specification, and FIG. 10 shows aberration diagrams thereof.

TABLE 5

Example 3

| Surface Number | R | D | Nd | vd | θgF |
|---|---|---|---|---|---|
| 1 | 240.83579 | 5.856 | 1.48749 | 70.24 | 0.53007 |
| 2 | −438.60260 | 0.240 | | | |
| 3 | 72.43191 | 10.738 | 1.49700 | 81.54 | 0.53748 |
| 4 | −438.58802 | 2.172 | 1.66687 | 58.16 | 0.54268 |
| 5 | 104.01262 | 0.289 | | | |
| 6 | 50.36970 | 4.283 | 1.51742 | 52.43 | 0.55649 |
| 7 | 34.88005 | 9.594 | 1.49700 | 81.54 | 0.53748 |
| 8 | 78.78298 | 6.939 | | | |
| 9 | 53.17916 | 3.526 | 2.00069 | 25.46 | 0.61364 |
| 10 | 77.81585 | 2.050 | 1.83400 | 37.34 | 0.57908 |
| 11 | 35.11509 | 16.665 | | | |
| 12 | 44.92113 | 1.144 | 1.58144 | 40.75 | 0.57757 |
| 13 | 28.72721 | 7.670 | 1.49700 | 81.54 | 0.53748 |
| 14 | 356.04089 | 10.167 | | | |
| 15(St) | ∞ | 5.412 | | | |
| 16 | −438.63193 | 1.089 | 1.91082 | 35.25 | 0.58224 |
| 17 | 41.77814 | 2.615 | | | |
| 18 | −88.58014 | 1.793 | 1.64000 | 60.08 | 0.53704 |
| 19 | 30.42554 | 4.002 | 1.80518 | 25.42 | 0.61616 |
| 20 | 189.70353 | 1.253 | | | |
| 21 | 83.37183 | 0.961 | 1.89286 | 20.36 | 0.63944 |
| 22 | 39.60945 | 9.682 | 1.67003 | 47.23 | 0.56276 |
| 23 | −94.19744 | 25.624 | | | |
| 24 | 136.55297 | 3.580 | 1.65818 | 32.99 | 0.59664 |
| 25 | −1554.58690 | 83.028 | | | |
| 26 | ∞ | 3.200 | 1.51680 | 64.20 | 0.53430 |
| 27 | ∞ | 0.004 | | | |

TABLE 6

Example 3

| | |
|---|---|
| f | 242.475 |
| Bf | 85.141 |
| FNo. | 4.12 |
| 2ω(°) | 13.6 |

Example 4

Figure 4:
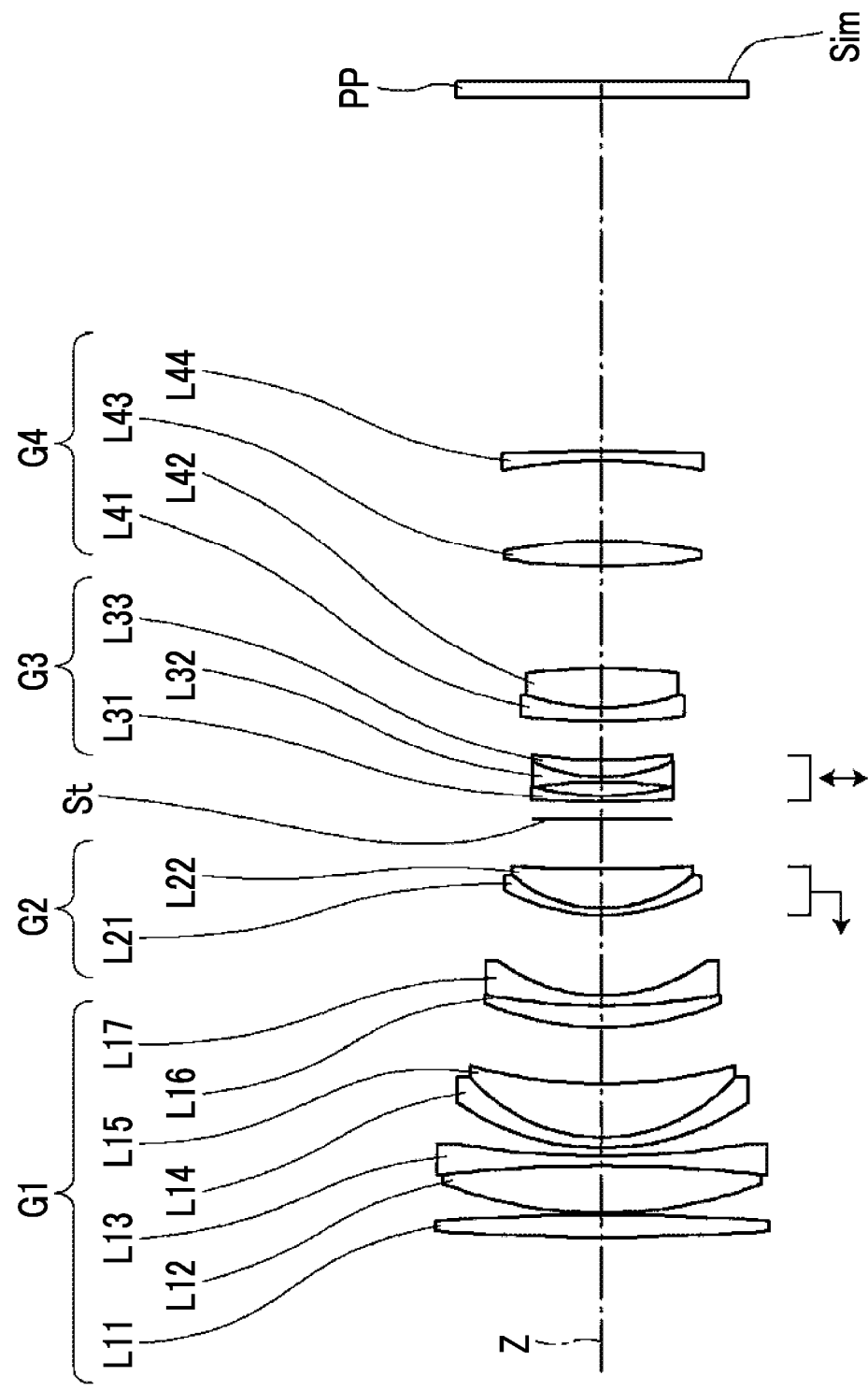
FIG. 4 is a cross-sectional view illustrating a configuration of an imaging lens of Example 4 of the present invention.
Figure 11:
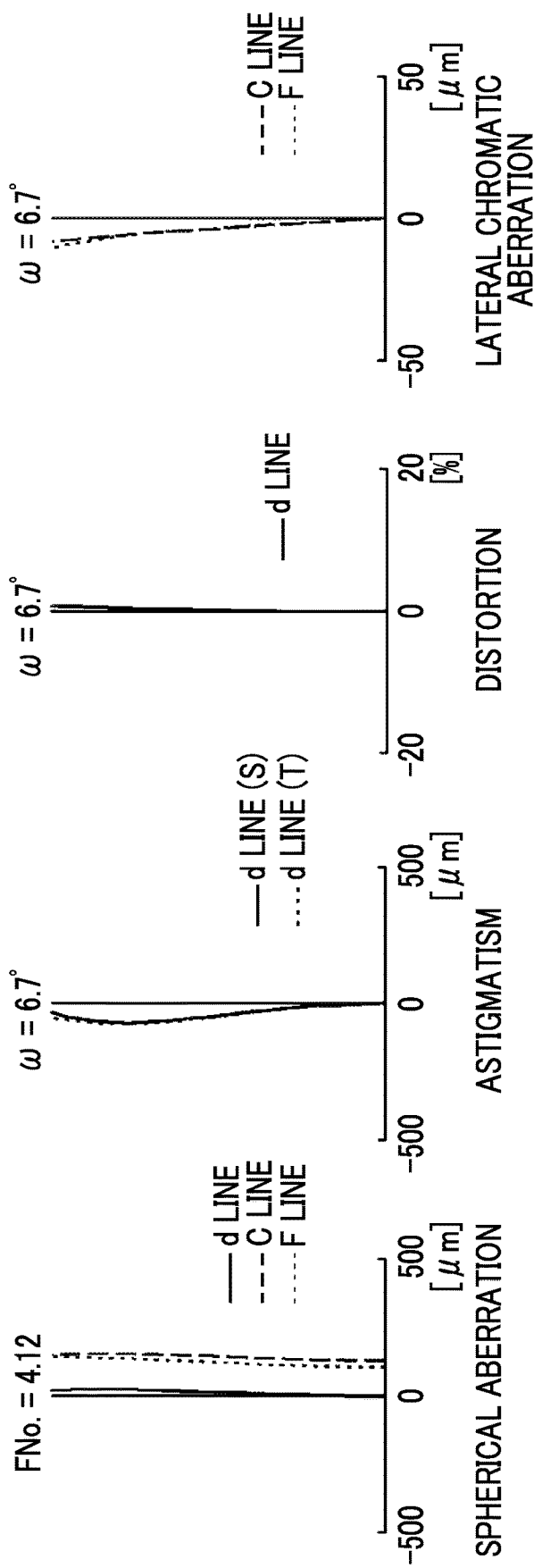
FIG. 11 is a diagram of aberrations of the imaging lens of Example 4 of the present invention.

FIG. 4 is a cross-sectional view of an imaging lens of Example 4. The imaging lens of Example 4 has the same configuration as the outline of the imaging lens of Example 1. The first lens group G1 consists of seven lenses L11 to L17 sequentially in order from the object side to the image side. The second lens group G2 consists of two lenses L21 and L22 in order from the object side to the image side. The third lens group G3 consists of three lenses L31 to L33 in order from the object side to the image side. The fourth lens group G4 consists of four lenses L41 to L44 in order from the object side to the image side. Table 7 shows basic lens data of the imaging lens of Example 4, and Table 8 shows specification, and FIG. 11 shows aberration diagrams thereof.

TABLE 7

Example 4

| Surface Number | R | D | Nd | vd | θgF |
|---|---|---|---|---|---|
| 1 | 438.62055 | 4.341 | 1.48749 | 70.24 | 0.53007 |
| 2 | -438.62055 | 0.304 | | | |
| 3 | 89.79334 | 9.252 | 1.49700 | 81.54 | 0.53748 |
| 4 | -293.78721 | 1.868 | 1.65160 | 58.62 | 0.54102 |
| 5 | 178.26171 | 1.572 | | | |
| 6 | 51.77411 | 2.111 | 1.51742 | 52.43 | 0.55649 |
| 7 | 35.69169 | 10.419 | 1.49700 | 81.54 | 0.53748 |
| 8 | 100.73818 | 10.783 | | | |
| 9 | 60.82735 | 4.246 | 1.90366 | 31.31 | 0.59481 |
| 10 | 133.76910 | 1.965 | 1.80610 | 40.93 | 0.57019 |
| 11 | 35.49136 | 15.648 | | | |
| 12 | 41.87137 | 1.270 | 1.60562 | 43.71 | 0.57214 |
| 13 | 27.99728 | 7.655 | 1.49700 | 81.54 | 0.53748 |
| 14 | 381.56007 | 9.769 | | | |
| 15(St) | ∞ | 3.471 | | | |
| 16 | 325.43949 | 1.012 | 1.85150 | 40.78 | 0.56958 |
| 17 | 50.38386 | 2.859 | | | |
| 18 | -78.67246 | 0.884 | 1.72916 | 54.09 | 0.54490 |
| 19 | 33.78564 | 3.389 | 1.84666 | 23.78 | 0.62054 |
| 20 | 108.44583 | 7.422 | | | |
| 21 | 126.22095 | 2.663 | 1.89286 | 20.36 | 0.63944 |
| 22 | 46.76052 | 7.711 | 1.67003 | 47.20 | 0.56337 |
| 23 | -114.04463 | 19.812 | | | |
| 24 | 128.10953 | 5.096 | 1.60342 | 38.03 | 0.58356 |
| 25 | -93.31371 | 15.690 | | | |
| 26 | -109.12859 | 1.720 | 1.72916 | 54.68 | 0.54451 |
| 27 | -794.71155 | 68.816 | | | |
| 28 | ∞ | 3.200 | 1.51680 | 64.20 | 0.53430 |
| 29 | ∞ | 0.021 | | | |

TABLE 8

Example 4

| | |
|---|---|
| f | 242.541 |
| Bf | 70.948 |
| FNo. | 4.12 |
| 2ω(°) | 13.4 |

Example 5

Figure 5:
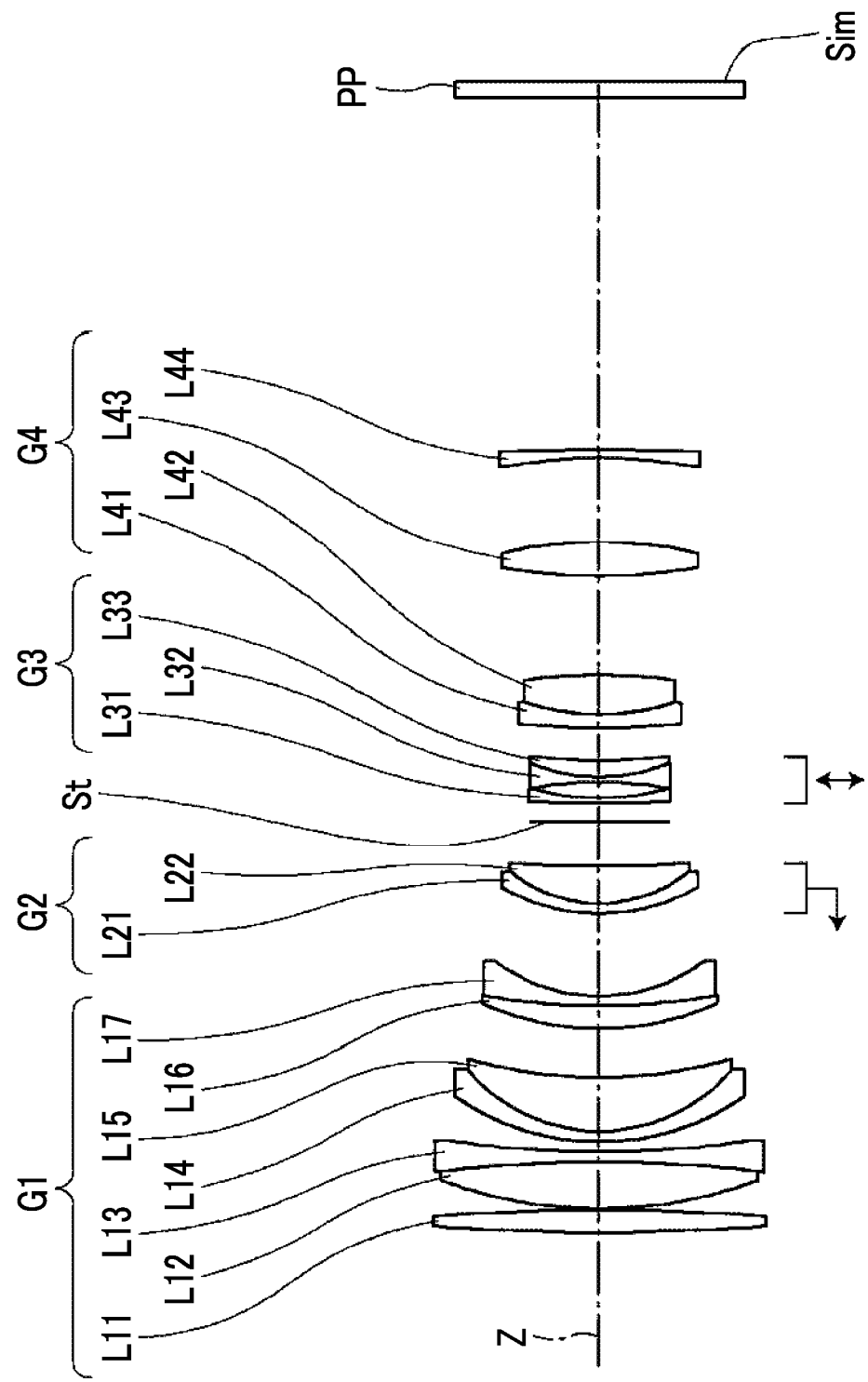
FIG. 5 is a cross-sectional view illustrating a configuration of an imaging lens of Example 5 of the present invention.
Figure 12:
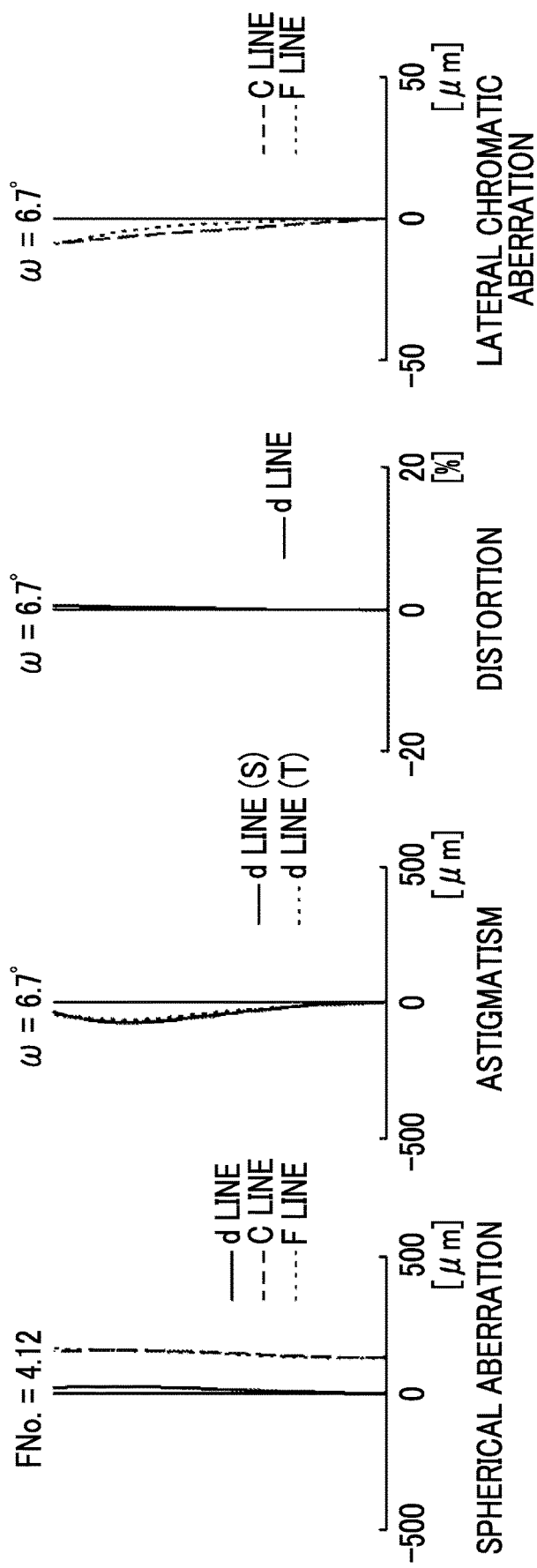
FIG. 12 is a diagram of aberrations of the imaging lens of Example 5 of the present invention.

FIG. 5 is a cross-sectional view of an imaging lens of Example 5. The imaging lens of Example 5 has the same configuration as the outline of the imaging lens of Example 1. The first lens group G1 consists of seven lenses L11 to L17 sequentially in order from the object side to the image side. The second lens group G2 consists of two lenses L21 and L22 in order from the object side to the image side. The third lens group G3 consists of three lenses L31 to L33 in order from the object side to the image side. The fourth lens group G4 consists of four lenses L41 to L44 in order from the object side to the image side. Table 9 shows basic lens data of the imaging lens of Example 5, Table 10 shows specification, and FIG. 12 shows aberration diagrams thereof.

TABLE 9

Example 5

| Surface Number | R | D | Nd | vd | θgF |
|---|---|---|---|---|---|
| 1 | 438.63112 | 4.341 | 1.48749 | 70.24 | 0.53007 |
| 2 | -438.63112 | 0.247 | | | |
| 3 | 92.49952 | 9.151 | 1.49700 | 81.54 | 0.53748 |
| 4 | -281.77308 | 1.944 | 1.65160 | 58.62 | 0.54102 |
| 5 | 199.52458 | 2.020 | | | |
| 6 | 51.99674 | 2.104 | 1.51742 | 52.43 | 0.55649 |
| 7 | 35.05062 | 10.529 | 1.49700 | 81.54 | 0.53748 |
| 8 | 100.42818 | 9.278 | | | |
| 9 | 58.28230 | 4.403 | 1.90366 | 31.31 | 0.59481 |
| 10 | 128.78569 | 2.008 | 1.80610 | 40.93 | 0.57019 |
| 11 | 35.51925 | 16.124 | | | |
| 12 | 40.13445 | 2.005 | 1.60562 | 43.71 | 0.57214 |
| 13 | 28.70635 | 7.324 | 1.43387 | 95.18 | 0.53733 |
| 14 | 438.63092 | 8.543 | | | |
| 15(St) | ∞ | 3.724 | | | |
| 16 | 357.14738 | 1.020 | 1.85150 | 40.78 | 0.56958 |
| 17 | 50.57626 | 3.094 | | | |
| 18 | -79.42340 | 0.977 | 1.72916 | 54.09 | 0.54490 |
| 19 | 35.36718 | 3.249 | 1.84666 | 23.78 | 0.62054 |
| 20 | 110.50728 | 6.394 | | | |
| 21 | 152.50777 | 2.635 | 1.89286 | 20.36 | 0.63944 |
| 22 | 48.23139 | 7.735 | 1.67003 | 47.20 | 0.56337 |
| 23 | -107.66790 | 19.429 | | | |
| 24 | 117.69688 | 6.666 | 1.60342 | 38.03 | 0.58356 |
| 25 | -85.77640 | 16.518 | | | |
| 26 | -108.12557 | 1.484 | 1.72916 | 54.68 | 0.54451 |
| 27 | -1000.01947 | 68.820 | | | |
| 28 | ∞ | 3.200 | 1.51680 | 64.20 | 0.53430 |
| 29 | ∞ | 0.032 | | | |

TABLE 10

Example 5

| | |
|---|---|
| f | 242.543 |
| Bf | 70.964 |
| FNo. | 4.12 |
| 2ω(°) | 13.4 |

Example 6

Figure 6:
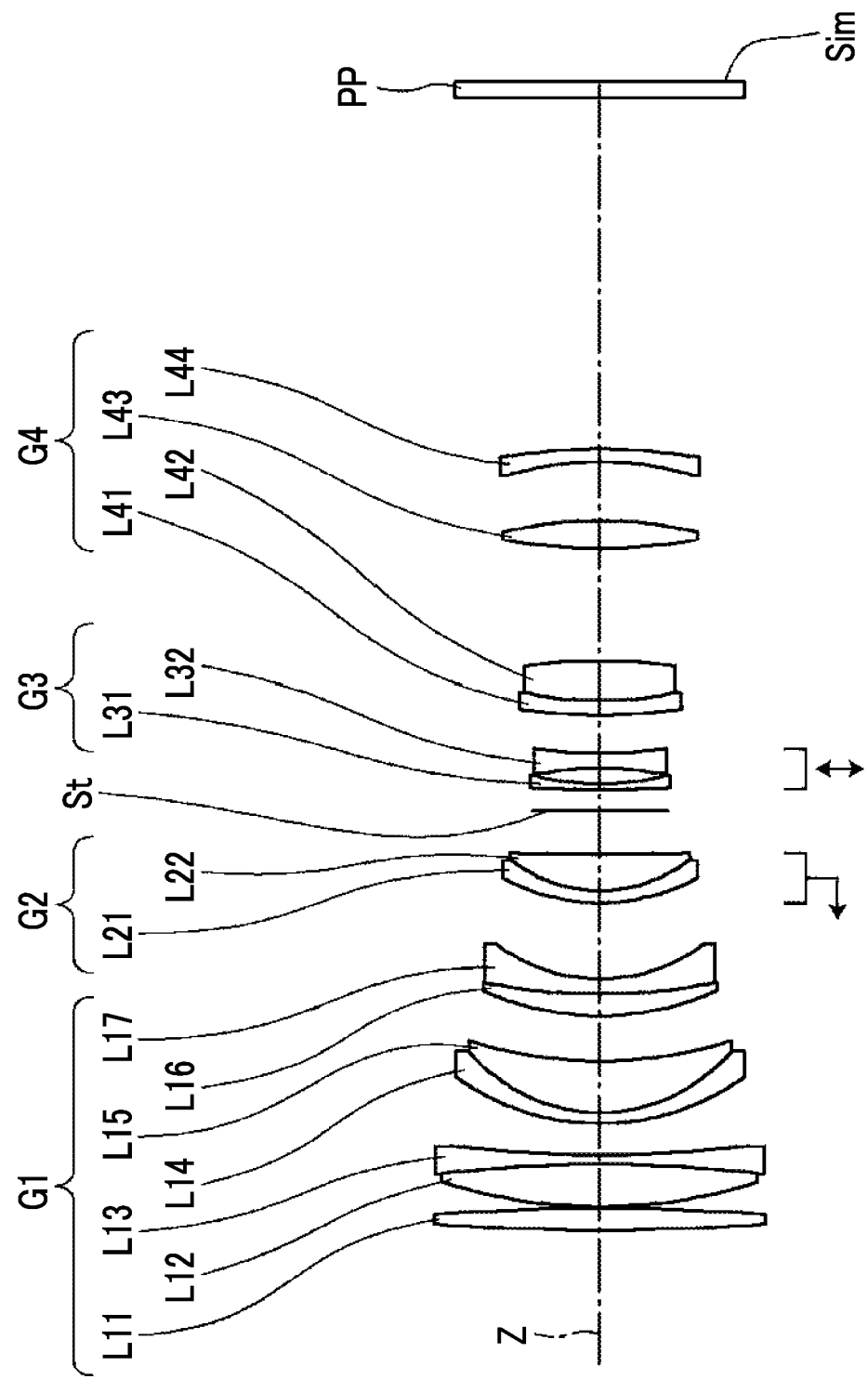
FIG. 6 is a cross-sectional view illustrating a configuration of an imaging lens of Example 6 of the present invention.
Figure 13:
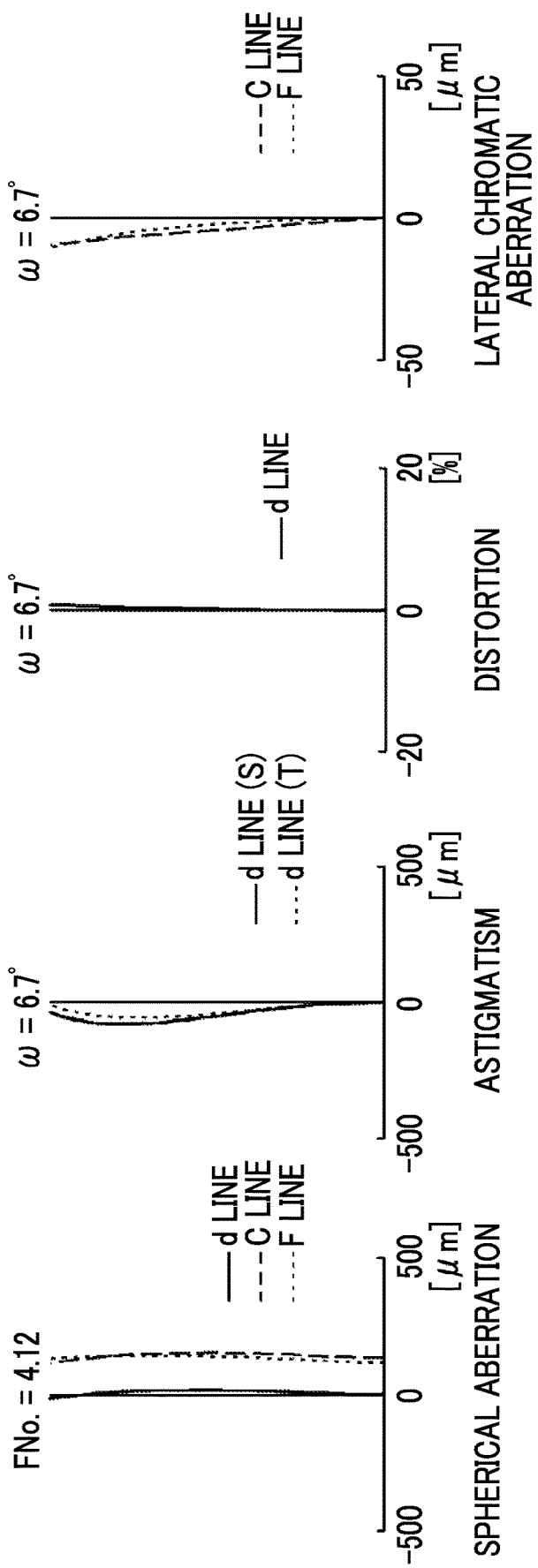
FIG. 13 is a diagram of aberrations of the imaging lens of Example 6 of the present invention.

FIG. 6 is a cross-sectional view of an imaging lens of Example 6. The imaging lens of Example 6 has the same configuration as the outline of the imaging lens of Example 1. The first lens group G1 consists of seven lenses L11 to L17 sequentially in order from the object side to the image side. The second lens group G2 consists of two lenses L21 and L22 in order from the object side to the image side. The third lens group G3 consists of two lenses L31 and L32 in order from the object side to the image side. The fourth lens group G4 consists of four lenses L41 to L44 in order from the object side to the image side. Table 11 shows basic lens data of the imaging lens of Example 5, Table 12 shows specification, and FIG. 13 shows aberration diagrams thereof.

In Table 11, the reference sign * is attached to surface numbers of aspheric surfaces, and numerical values of the paraxial radius of curvature are written into the column of the radius of curvature of the aspheric surface. Table 13 shows surface numbers of the aspheric surfaces, and aspheric surface coefficients of the respective aspheric surfaces. The "E±n" (n: an integer) in numerical values of the aspheric surface coefficients of Table 13 indicates "×10$^{±n}$". The aspheric surface coefficients are values of the coefficients KA and Am (m=3, 4, 5, . . . ) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

TABLE 11

Example 6

| Surface Number | R | D | Nd | νd | θgF |
|---|---|---|---|---|---|
| 1 | 438.58008 | 4.342 | 1.48749 | 70.24 | 0.53007 |
| 2 | −438.58008 | 0.250 | | | |
| 3 | 107.32089 | 8.322 | 1.49700 | 81.54 | 0.53748 |
| 4 | −279.53618 | 1.950 | 1.65160 | 58.62 | 0.54102 |
| 5 | 275.04981 | 5.997 | | | |
| 6 | 50.56998 | 2.204 | 1.51742 | 52.43 | 0.55649 |
| 7 | 35.05153 | 10.112 | 1.49700 | 81.54 | 0.53748 |
| 8 | 90.51726 | 8.827 | | | |
| 9 | 58.28612 | 4.202 | 1.90366 | 31.31 | 0.59481 |
| 10 | 118.42000 | 2.970 | 1.80610 | 40.93 | 0.57019 |
| 11 | 35.26634 | 14.990 | | | |
| 12 | 42.39364 | 2.310 | 1.56732 | 42.82 | 0.57309 |
| 13 | 29.63183 | 7.040 | 1.43875 | 94.66 | 0.53402 |
| 14 | 429.47610 | 8.568 | | | |
| 15(St) | ∞ | 4.335 | | | |
| *16 | 357.12638 | 1.025 | 1.76521 | 32.85 | 0.59401 |

TABLE 11-continued

Example 6

| Surface Number | R | D | Nd | νd | θgF |
|---|---|---|---|---|---|
| *17 | 55.83052 | 3.031 | | | |
| 18 | −70.85488 | 2.878 | 1.70945 | 56.03 | 0.54363 |
| 19 | 104.88455 | 7.611 | | | |
| 20 | 139.85427 | 2.666 | 1.95034 | 27.48 | 0.60591 |
| 21 | 75.47311 | 7.642 | 1.70975 | 29.51 | 0.60502 |
| 22 | −116.78453 | 21.988 | | | |
| 23 | 109.49943 | 5.704 | 1.57996 | 40.35 | 0.57602 |
| 24 | −82.49903 | 11.530 | | | |
| 25 | −65.44503 | 2.406 | 2.00001 | 27.82 | 0.60562 |
| 26 | −129.77188 | 68.816 | | | |
| 27 | ∞ | 3.200 | 1.51680 | 64.20 | 0.53430 |
| 28 | ∞ | 0.023 | | | |

TABLE 12

Example 6

| | |
|---|---|
| f | 242.517 |
| Bf | 70.949 |
| FNo. | 4.12 |
| 2ω(°) | 13.4 |

TABLE 13

Example 6

| Surface Number | 16 | 17 |
|---|---|---|
| KA | 4.2641687E+00 | 9.8538306E−01 |
| A3 | −2.4157292E−07 | −3.4281116E−07 |
| A4 | −1.8845838E−07 | −8.5297902E−07 |
| A5 | 1.9756598E−09 | −1.0996087E−08 |
| A6 | 6.4542287E−11 | −1.2575554E−13 |
| A7 | 4.0955448E−14 | 4.6204547E−12 |
| A8 | −8.1675328E−14 | −5.7013968E−14 |
| A9 | −7.4024136E−15 | −2.6331635E−14 |
| A10 | −9.1764222E−16 | −2.8473312E−15 |
| A11 | −1.1834289E−16 | −1.8498833E−16 |
| A12 | −9.9057160E−18 | −1.0450240E−17 |
| A13 | −1.1112985E−18 | −2.4798929E−18 |
| A14 | −1.1228893E−20 | −4.3326607E−20 |
| A15 | 1.4664311E−21 | −5.1172447E−21 |
| A16 | 3.4413852E−23 | 3.4049552E−22 |
| A17 | −5.2515832E−24 | 2.3364426E−23 |

Table 14 shows values corresponding to Conditional Expressions (1) to (4) of the imaging lenses of Examples 1 to 6. In Examples 1 to 6, the d line is set as the reference wavelength. Table 14 shows the values on the d line basis.

TABLE 14

| Expression Number | | Example 1 | Example 2 | Example 3 | Example 4 | Example 5 | Example 6 |
|---|---|---|---|---|---|---|---|
| (1) | TTL/Bf | 3.17 | 3.16 | 2.61 | 3.27 | 3.27 | 3.27 |
| (2) | f/f2 | 2.06 | 2.05 | 2.12 | 2.28 | 2.01 | 1.98 |
| (3) | \|θgF22 − θgF21\| | 0.039 | 0.039 | 0.040 | 0.035 | 0.035 | 0.039 |
| (4) | f1/f2 | 2.10 | 2.06 | 2.25 | 2.55 | 1.92 | 1.94 |

Figure 14:
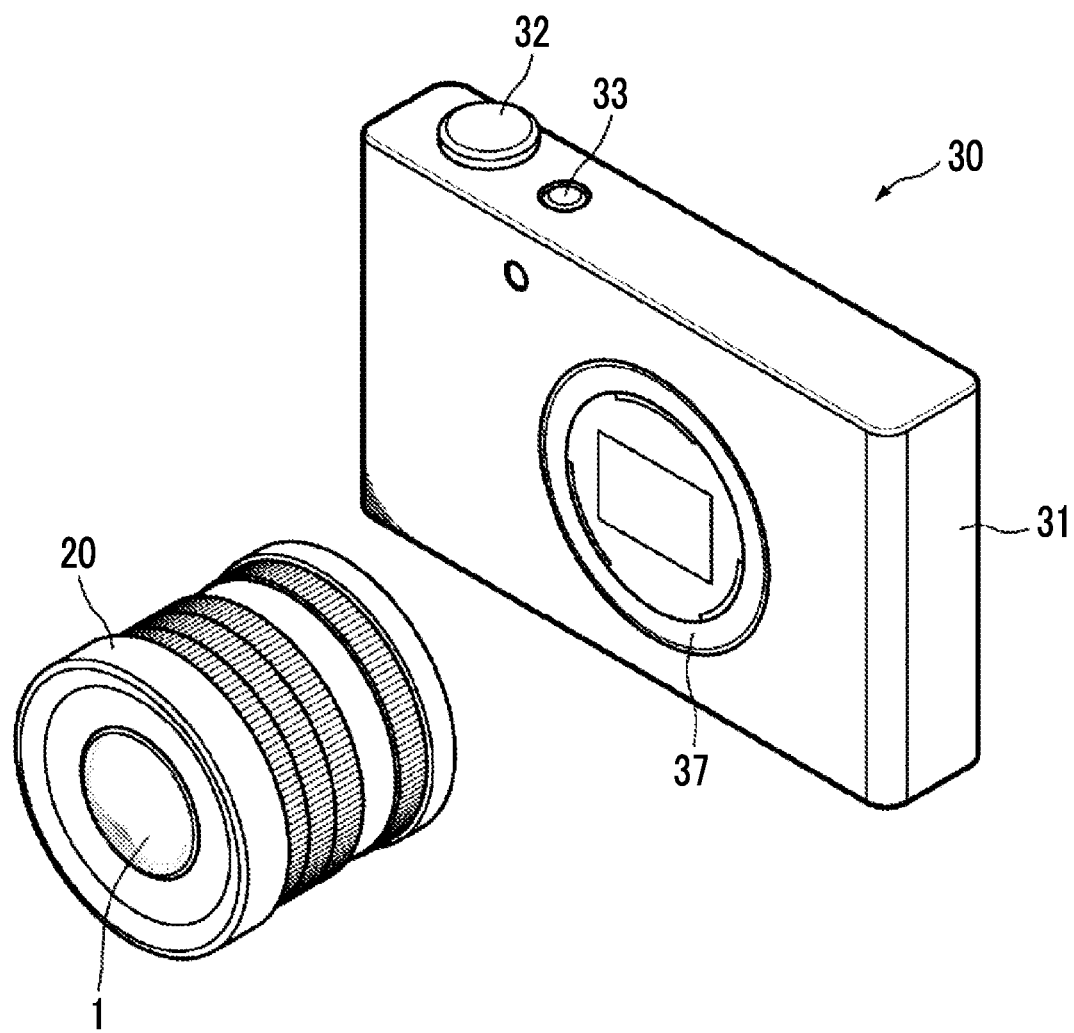
FIG. 14 is a perspective view of the front side of an imaging apparatus according to an embodiment of the present invention.
Figure 15:
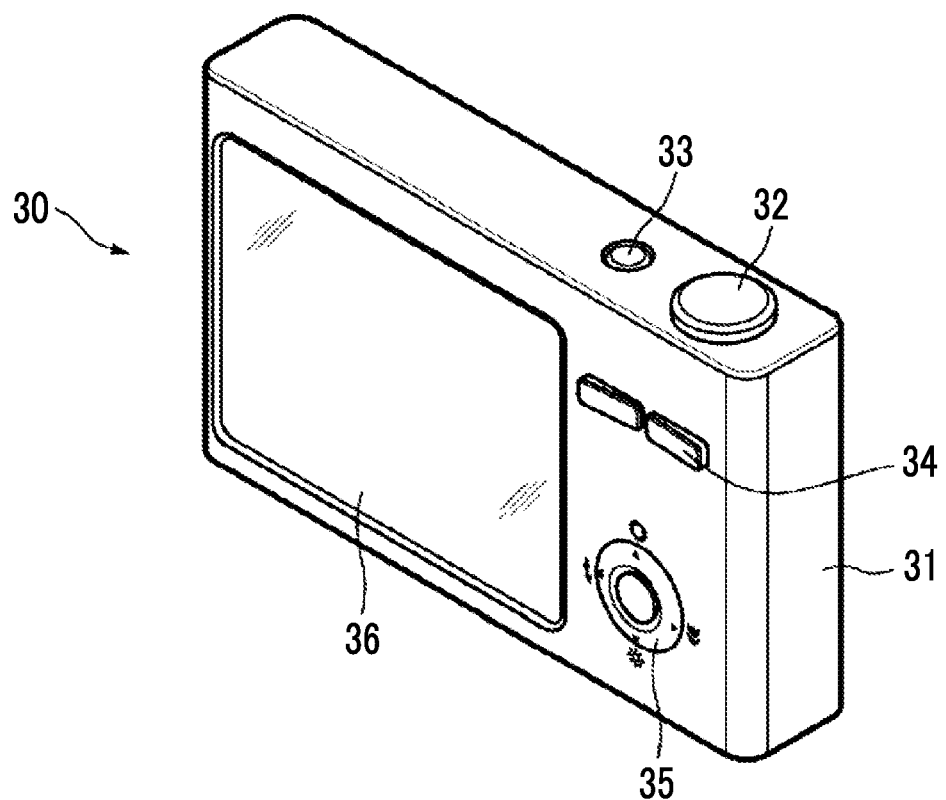
FIG. 15 is a perspective view of the rear side of an imaging apparatus according to an embodiment of the present invention.

Next, an imaging apparatus according to an embodiment of the present invention will be described. FIGS. 14 and 15 are external views of a camera 30 which is the imaging apparatus according to the above-mentioned embodiment of the present invention. FIG. 14 is a perspective view of the camera 30 viewed from the front side, and FIG. 15 is a perspective view of the camera 30 viewed from the rear side. The camera 30 is a single-lens digital camera on which an interchangeable lens 20 is detachably mounted and which has no reflex finder. The interchangeable lens 20 is configured such that the imaging lens 1 according to the above-mentioned embodiment of the present invention is housed in a barrel.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, the radius of curvature, the surface distance, the refractive index, and the Abbe number of each lens are not limited to the values shown in the numerical examples, and different values may be used therefor.

Further, the imaging apparatus according to the embodiment of the present invention is also not limited to the above-mentioned examples. For example, various forms such as a single lens reflex type camera, a film camera, a video camera, and the like can be adopted.

What is claimed is:

1. An imaging lens consisting of, in order from an object side to an image side:
   a first lens group that has a positive refractive power;
   a second lens group that has a positive refractive power;
   a stop;
   a third lens group that has a negative refractive power; and
   a fourth lens group that has a refractive power,
   wherein the first lens group has, in order from the object side to the image side, a single lens having a positive refractive power, and two or more cemented lenses, and each cemented lens includes a positive lens and a negative lens,
   wherein the second lens group consists of a negative lens and a positive lens,
   wherein during image blur correction, the entire third lens group moves in a direction in which the third lens group can be set to have a component perpendicular to an optical axis, and the first lens group, the second lens group, and the fourth lens group remain stationary with respect to an image plane, and
   wherein in a state where an object at infinity is in focus, assuming that a back focal length of the whole system at an air-converted distance is Bf and a sum of the Bf and a distance on the optical axis from a lens surface closest to the object side to a lens surface closest to the image side is TTL, Conditional Expression (1) is satisfied, $$2 < TTL/Bf < 3.6 \quad (1).$$

2. The imaging lens according to claim 1, wherein during focusing from the object at infinity to a close-range object, the second lens group moves toward the object side along the optical axis, and the first lens group, the third lens group, and the fourth lens group remain stationary with respect to the image plane.

3. The imaging lens according to claim 2, wherein assuming that a focal length of the whole system in a state where the object at infinity is in focus is f and a focal length of the second lens group is f2, Conditional Expression (2) is satisfied, $$1.8 < f/f2 < 2.5 \quad (2).$$

4. The imaging lens according to claim 1, wherein assuming that a partial dispersion ratio between a g line and an F line of the positive lens of the second lens group is θgF22 and a partial dispersion ratio between the g line and the F line of the negative lens of the second lens group is θgF21, Conditional Expression (3) is satisfied, $$0.03 < |\theta gF22 - \theta gF21| < 0.045 \quad (3).$$

5. The imaging lens according to claim 1, wherein assuming that a focal length of the first lens group is f1 and a focal length of the second lens group is f2, Conditional Expression (4) is satisfied, $$1 < f1/f2 < 3 \quad (4).$$

6. The imaging lens according to claim 1, wherein the second lens group consists of, in order from the object side to the image side, a negative meniscus lens concave toward the image side and a positive meniscus lens concave toward the image side.

7. The imaging lens according to claim 1, wherein the third lens group has two or more lenses.

8. The imaging lens according to claim 1, wherein the third lens group has a negative lens concave toward the image side and a biconcave lens.

9. The imaging lens according to claim 1, wherein the fourth lens group has three or more lenses including a cemented lens.

10. The imaging lens according to claim 1,
   wherein a second cemented lens is disposed to be adjacent to a first cemented lens on the image side of the first cemented lens which is disposed to be closest to the object side in the first lens group, and
   wherein the first cemented lens has a cemented surface convex toward the image side, and the second cemented lens has a cemented surface convex toward the object side.

11. The imaging lens according to claim 1, wherein all the cemented lenses of the first lens group each have a convex surface closest to the object side and a concave surface closest to the image side.

12. The imaging lens according to claim 1, wherein Conditional Expression (1-1) is satisfied, $$2.5 < TTL/Bf < 3.5 \tag{1-1}$$

13. The imaging lens according to claim 3, wherein Conditional Expression (2-1) is satisfied, $$2 < f/f2 < 2.4 \tag{2-1}$$

14. The imaging lens according to claim 4, wherein Conditional Expression (3-1) is satisfied, $$0.032 < |\theta gF22 - \theta gF21| < 0.042 \tag{3-1}$$

15. The imaging lens according to claim 5, wherein Conditional Expression (4-1) is satisfied, $$1.5 < f1/f2 < 2.8 \tag{4-1}$$

16. An imaging apparatus comprising the imaging lens according to claim 1.

* * * * *